EDMUND J. POPIEL
*INVENTOR.*

United States Patent Office 3,112,965
Patented Dec. 3, 1963

3,112,965
BEARING ADJUSTING MEANS
Edmund J. Popiel, Detroit, Mich., assignor to Ford Motor Company, Dearborn, Mich., a corporation of Delaware
Continuation of applications Ser. No. 834,998, Aug. 20, 1959, and Ser. No. 167,123, Jan. 18, 1962. This application Sept. 14, 1962, Ser. No. 223,731
1 Claim. (Cl. 308—178)

This application is a continuation of my earlier filed applications Serial Number 834,998, filed August 20, 1959, and Serial Number 167,123, filed January 18, 1962, both of which are now abandoned.

The present invention relates to locking devices and more particularly to a positive lock mechanism for threaded nuts.

In certain applications such as in differential gear units, it is necessary to accurately position threaded nuts in order to retain components of the mechanism with which the nut is associated in their designed position and preload condition. Not only must the nut be set in a precise position, but is must also be positively retained in the specified location.

Therefore, it is an object of the present invention to provide a nut and locking member combination which may be accurately positioned and positively secured.

It is a further object of the present invention to provide a nut lock for a retaining nut which will positively hold the nut in a selected position and is adapted to permit securing of the nut in very small angular increments.

These and further objects of the present invention will become apparent from the following detailed description of the accompanying drawings in which.

Figure 3:
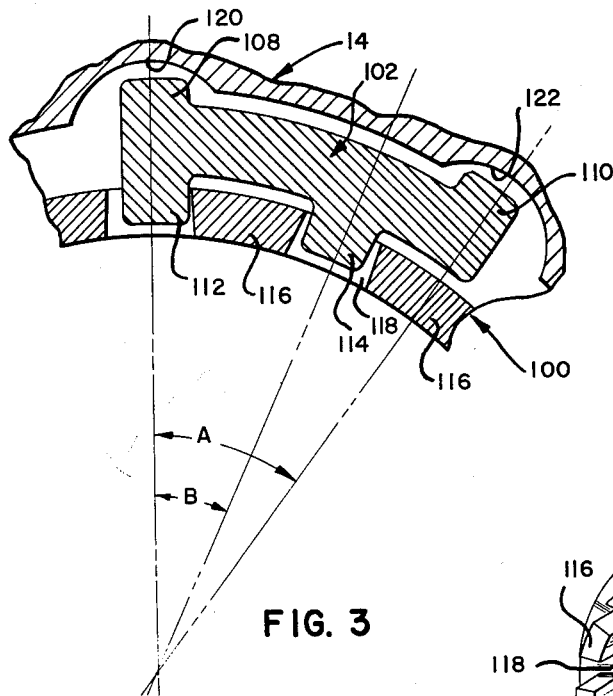
FIGURE 3 is an enlarged view disclosing the locking member in association with the retaining nut.
Figure 5:
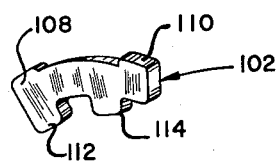
Figure 4:
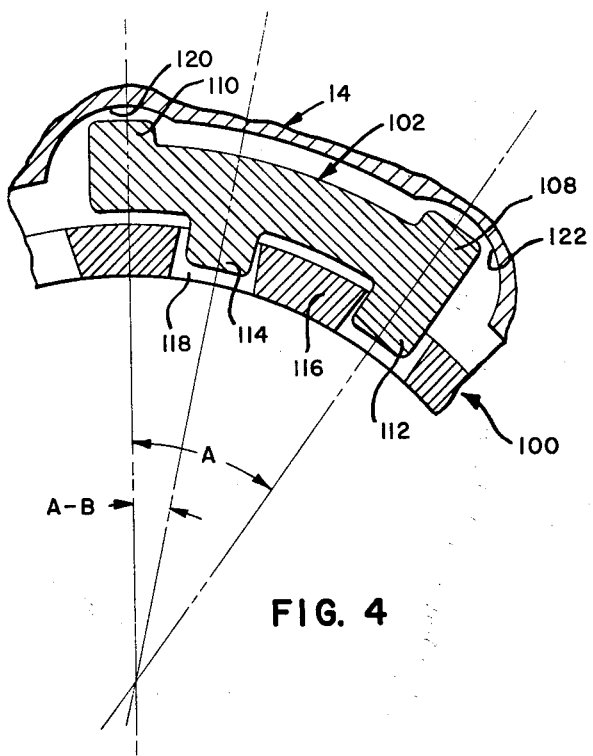

FIGURE 4 corresponds to FIGURE 3 and shows alternate placement of the locking member;

FIGURE 5 is a perspective of the locking member; and

Figure 6:
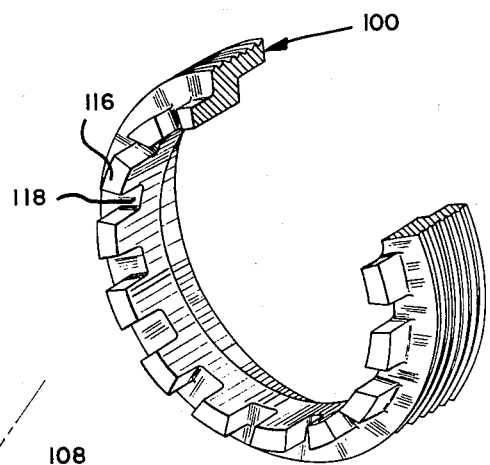

FIGURE 6 is a perspective partly in section of the retaining nut.

Figure 1:
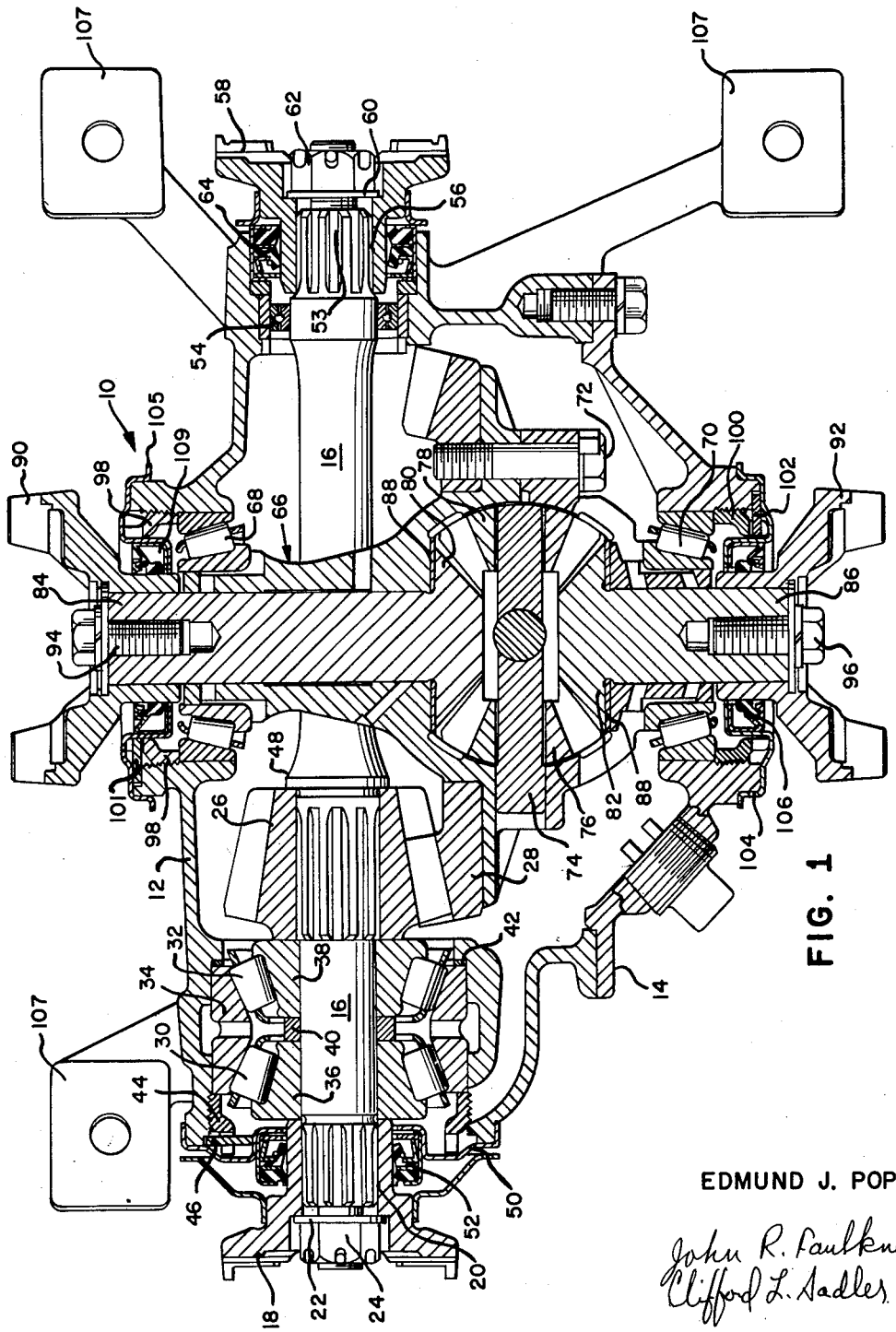
FIGURE 1 is a top plan view in section of a differential gear unit embodying the present invention.

Referring now to FIGURE 1 of the drawings, a differential gear unit 10 is disclosed which incorporates the preferred embodiment of the present invention. The nut and lock member combination is disclosed herein as being associated with a differential gear unit. While a differential is an excellent example of the application of the nut and lock, it should be understood that the combination is adaptable to other applications also.

Differential 10 is provided with a two-part housing 12 and 14 having a shaft 16 positioned therein which may be referred to as either a pinion shaft or a drive-through shaft in the following description. Shaft 16 and the differential gearing associated therewith is adapted to receive torque from the drive shaft of a prime mover by means of a universal joint, one flange of which is shown at 18. Flange 18 is splined at 20 to the left-hand end of the pinion shaft 16 and is secured by a flat washer 22 and a nut 24. Spaced from the universal joint flange 18 and also splined to the pinion shaft 16 is a hypoid pinion gear 26 which engages a hypoid ring gear 28 of a differential carrier that will be later described in detail. Rotatably supporting the shaft 16 between the flange 18 and the hypoid pinion 26 is a span of anti-friction tapered roller bearings 30 and 32 which have a common outer race 34 and separate inner races 36 and 38.

A spacer ring 40 of preselected thickness is provided between the inner races 36, 38 for the preloading of the bearings 30, 32. The outer race 34 is seated in the housing 12 and is provided with a shim 42 of selected thickness to permit the desired axial placement of the pinion shaft 16. The outer race 34 is held securely within the housing 12 and tightly against the shim 42 by means of a castellated retaining nut 44 and a lock member 46 engageable therewith. The hypoid pinion 26 is located on the pinion shaft 16 by means of a shoulder 48. Washer 22 and nut 24 thus retain the flange 18, the race 36, spacer 40, race 38 and pinion 26 in their serial position on shaft 16 and exert the preload force which is on the bearings 30 and 32.

A stamped metal cover 50 is provided about the end of the housing 12. Cover 50 snaps in place to hold the lock member 46 in position and also to retain an oil seal 52.

The output end 53 of the pinion or drive-through shaft 16 is supported by a roller bearing 54 and is splined at 56 to receive a flange 58 of a universal joint. Flange 58 is secured by means of a washer 60 and a nut 62. An oil seal 64 is provided between the outside diameter of the flange 58 and the housing 12 for the retention of oil within the housing.

A bipartite differential carrier 66 is supported by a span of tapered roller bearings 68 and 70. The two parts of the carrier 66 and the ring gear 28 are secured together by appropriate means such as bolts 72.

It should be noted that the drive pinion 26 and ring gear 28 are of the hypoid type permitting the axis of rotation of the pinion gear 26 to be substantially vertically offset from the axis of rotation of the ring gear 28. This offset is sufficient to allow the shaft 16 to pass across the differential carrier 66 without mechanical interference.

Positioned within the carrier 66 is a differential pinion shaft 74 which rotatably supports a pair of pinions 76, 78 of the bevel gear type. Engaging the bevel pinions 76, 78 are a pair of side gears 80, 82 which are also necessarily of the bevel gear type. Integral with the side gears 80, 82 are short connecting shafts 84, 86. Thrust washers 88 are interposed between the side gears 80, 82 and the differential carrier 66. Flanges 90, 92 for universal joints are bolted at 94, 96 to the outer ends of the connecting shafts 84, 86. These flanges 90, 92 are employed to transmit power to the axles of the driving wheels for the vehicle using the differential 10.

The tapered roller bearings 68, 70 are secured in place by castellated retaining nuts 98 and 100 which are similar to nut 44 and in one physical embodiment of the invention are interchangeable therewith and similarly, locking members 101, 102 are provided which are interchangeable with locking member 46. Stamped metal covers 104, 105 and oil seals 106, 109 are provided about the flanges 90, 92 of the universal joints to hold the locking member in place and to retain lubricant within the housing 12, 14 respectively.

The differential unit 10 embodying the present invention is of a type employed with independently sprung driving wheels. Unit 10 is bolted to the chassis of the vehicle by using the brackets 107 and swing axles are attached at the universal flanges 90, 92. The differential 10 operates in a conventional fashion to distribute power to the connecting shafts 84, 86.

Because the retaining nuts 98, 100 are provided at its two extremes, axial positioning of the carrier 66 is allowable. Such adjustment is necessary in order that the ring gear 28 may be properly aligned with the hypoid pinion 26. Also, shims 42 are provided to permit the proper placement of shaft 16. It is absolutely necessary that the ring gear 28 and pinion 26 be in proper mesh in order to avoid abnormal gear tooth wear.

The required finite adjustment of the axial positions of the shaft 16 and carrier 66 necessitates a retaining nut and locking device combination which will positively hold the nut when in its proper setting but can be adapted to a variety of nut positions. The present invention constitutes such a combination and as the nuts 44, 98 and 100 and the locking members 46, 101 and 102 are identical in shape and function, the following detailed description will suffice for all of them.

Referring to FIGURE 5, the nut lock 102 has a generally arcuate shape with radially outwardly extending tangs 108 and 110 and a pair of radially inwardly extending tangs 112 and 114. In FIGURE 6, it is seen that the castelated nut 100 has a threaded exterior and a plurality of circumferentially spaced axially extending tangs 116.

Figure 2:
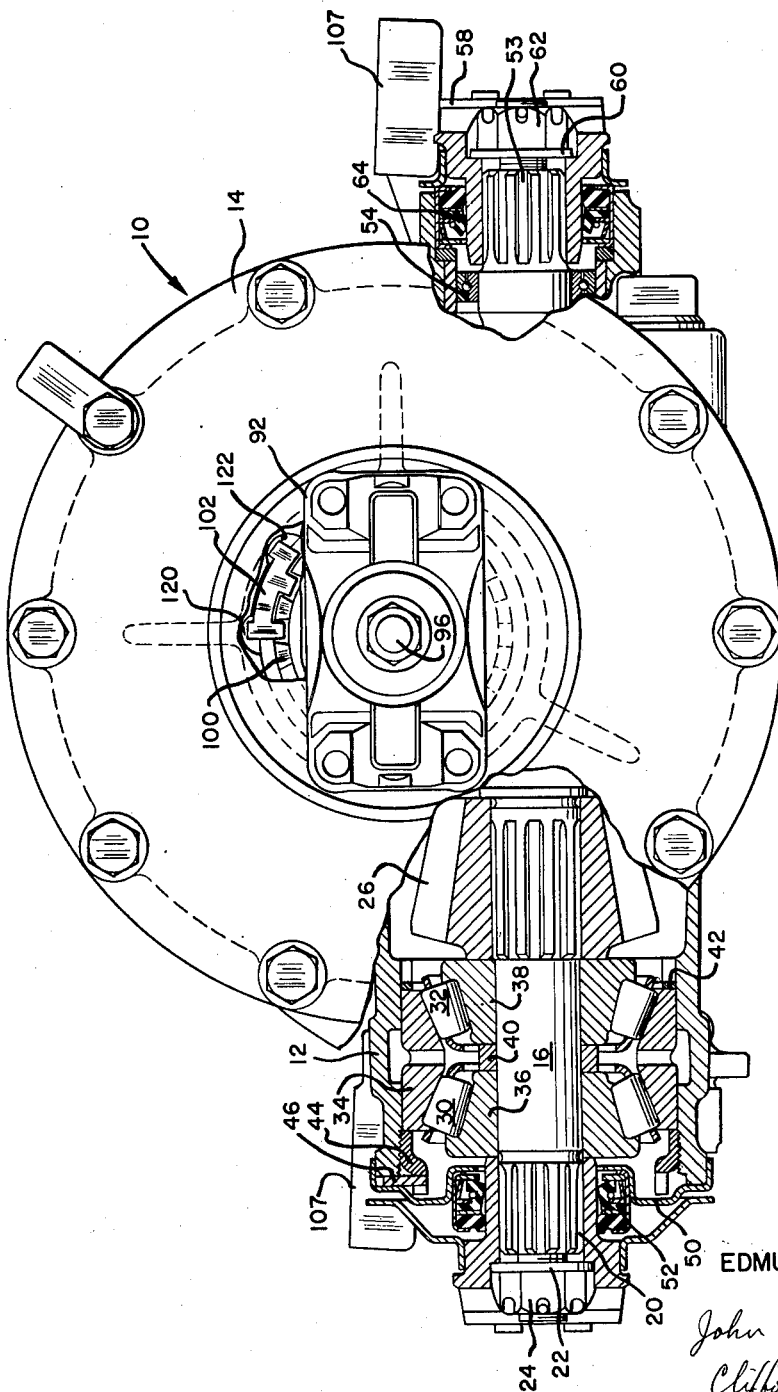
FIGURE 2 is an elevational view partly in section of the unit of FIGURE 1.

Spaces 118 between the tangs 116 are dimensioned to receive the inner tangs 112, 114 of the lock 102. Referring to FIGURES 2, 3 and 4, the end of the housing 14 which threadably receives the retaining nut 100 is provided with milled out scallops or slots 120, 122 which accommodate the outer tangs 108, 110 of the lock 102. After the retaining nut 100 is threaded in so as to position the carrier 66 properly, the lock member 102 is slipped in position with the inner tangs 112, 114 engaging the spaces 118 between the tangs 116 and outer tangs 108, 110 engaging the milled slots 120, 122. The cover plate 104 prevents the displacement of the lock 102. Engagement of the outer tangs 108, 110 with the housing 14 and the inner tangs 112, 114 with the nut 100 prevents the nut from rotating relative to the housing 14.

Upon closer examination, it will be noted that the lock 102 is formed in the segment of a circle and that the various tangs 108, 110, 112, 114 are radially directed from that segment. The outer tangs 108 and 110 are separated by an angle "A." Inner tang 112 is in radial alignment with outer tang 108. However, tang 114 is circumferentially displaced from tang 110 and is separated from tangs 108, 112 by an angle "B." The relationship between tangs 114 and 110 is obviously the angle A minus B.

The lock member 102 may be rotated 180° in flip-flop fashion about a radial axis to attain alternate locking positions. In order to obtain locking and positioning of the nut 100, the lock member 102 may be positioned either as shown in FIGURE 3 or as shown in FIGURE 4. In FIGURE 4, the lock member 102 is turned about so that tangs 112, 108 appear on the right rather than the left and tangs 110 and 114 are similarly in reversed position. Referring to FIGURE 4, the first tang 114 is now angularly displaced from the slot 120 by the angle A minus B rather than being in radial alignment as shown in FIGURE 3. Therefore, the nut 100 can be adjusted and locked in position in angular increments equal to A minus B.

In one experimentally constructed physical embodiment of the present invention, angle A equals 36°, angle B equals 24° and, therefore, angle A minus B equals 12° or one-half of the angle B. With the inner tangs 114 and 112 being 24° apart and engaging the slots 118 in the nut 100, it is also apparent that the slots 118 were provided equally spaced apart and 15 in number. This particular lock member configuration permits adjustment of the nut in 12° increments which is equal to the angle A minus B. With the angle A minus B being one-half of the angle B, the adjustment of the nut 100 can be made in equal increments. It is obvious that other angular relationships may have been selected which would permit even finer adjustment of the nut 100. However, for purposes of differential pinion positioning, increments of 12° were found to be most satisfactory.

The foregoing description of the present invention has been set forth to present its preferred embodiment. Obviously other configurations and applications of the lock and nut may occur to those skilled in the art which will come within the scope and spirit of the following claim. By way of example, this invention is equally adaptable to locking a nut which is threaded onto a shaft rather than into a bore in a housing.

I claim:

A mechanism having a housing, a shaft and bearing means rotatably supporting said shaft relative to said housing, means for positioning said bearing, said means including an externally threaded castellated nut engaging said housing, lock means for establishing a positive angular relationship between said nut and said housing, said lock means having an arcuate body portion corresponding to the minor arc of a circle, said lock means also having radially directed sets of two inner and two outer tangs, the angular spacing of the tangs of one set being two-thirds of the angular spacing of the tangs of the other set, one of said inner tangs being in radial alignment with one of said outer tangs, said housing and said nut having tang receiving portions, the number of tang receiving portions of said housing being two, said lock means being adapted to engage said nut and said housing to establish a first angular relationship, said lock means being rotatable 180° about a radial axis to establish a second angular relationship between said housing and said nut, said radial axis bisecting the included angle of the tangs of said one set, the difference between said first and second angular relationships being less than the angular spacing of the tang receiving portions of either the nut or the housing, an oil seal engaging said shaft, a sheet metal member secured to said housing and positioning said oil seal relative to said shaft, said sheet metal member holding said lock means in engagement with both said housing and said nut.

References Cited in the file of this patent

UNITED STATES PATENTS

| | | |
|---|---|---|
| 1,434,578 | Alden | Nov. 7, 1922 |
| 1,614,992 | Roberts | Jan. 18, 1927 |
| 2,986,435 | Rundt | May 30, 1961 |
| 3,001,842 | Boyd | Sept. 26, 1961 |
| 3,023,057 | Edwards | Feb. 27, 1962 |

FOREIGN PATENTS

| | | |
|---|---|---|
| 540,815 | Germany | Dec. 30, 1931 |
| 54,579 | France | Oct. 31, 1949 |